United States Patent
Cheng (10) Patent No.: US 6,604,779 B1
(45) Date of Patent: Aug. 12, 2003

(54) VEHICLE BODY STRUCTURE WITH U-SHAPED STRIP PORTIONS

(76) Inventor: Jian-Rung Cheng, 9F, No. 90, Hsing-Te Rd., San-Chung City, Taipei Hsien (TW)

( * ) Notice: Subject to any disclaimer, the term of this patent is extended or adjusted under 35 U.S.C. 154(b) by 0 days.

(21) Appl. No.: 10/222,561

(22) Filed: Aug. 16, 2002

(51) Int. Cl.[7] .................................................. B60J 7/00
(52) U.S. Cl. ................................................... 296/188
(58) Field of Search .............................. 296/210, 188, 296/189, 146.6, 69.2; 293/120, 132, 133, 155; 244/125; 114/341

(56) References Cited

U.S. PATENT DOCUMENTS 3,506,295 A * 4/1970 Yancey
4,227,593 A * 10/1980 Bricmont et al. ....... 293/133 X
4,948,196 A * 8/1990 Baba et al. ................. 296/188
6,547,280 B1 * 4/2003 Ashmead ................ 296/189 X

* cited by examiner

Primary Examiner—Joseph D. Pape
(74) Attorney, Agent, or Firm—Merchant & Gould P.C.

(57) ABSTRACT

A vehicle body structure includes a reinforcing unit disposed between outer and inner walls. The reinforcing unit includes an intermediate plate disposed between the outer and inner walls, and a plurality of reinforcing members, each of which has a first U-shaped strip portion mounted fixedly between the inner wall and the intermediate plate, and a second U-shaped strip portion mounted fixedly between the outer wall and the intermediate plate. Each first U-shaped strip portion has two ends connected fixedly to the intermediate plate, and a bent portion connected fixedly to the inner wall. Each second U-shaped strip portion has two ends connected fixedly to the intermediate plate, and a bent portion connected fixedly to the outer wall.

7 Claims, 15 Drawing Sheets

FIG. 14

VEHICLE BODY STRUCTURE WITH U-SHAPED STRIP PORTIONS

BACKGROUND OF THE INVENTION

1. Field of the Invention

The invention relates to a vehicle body structure, more particularly to a vehicle body with U-shaped strip portions.

2. Description of the Related Art

Figure 1:
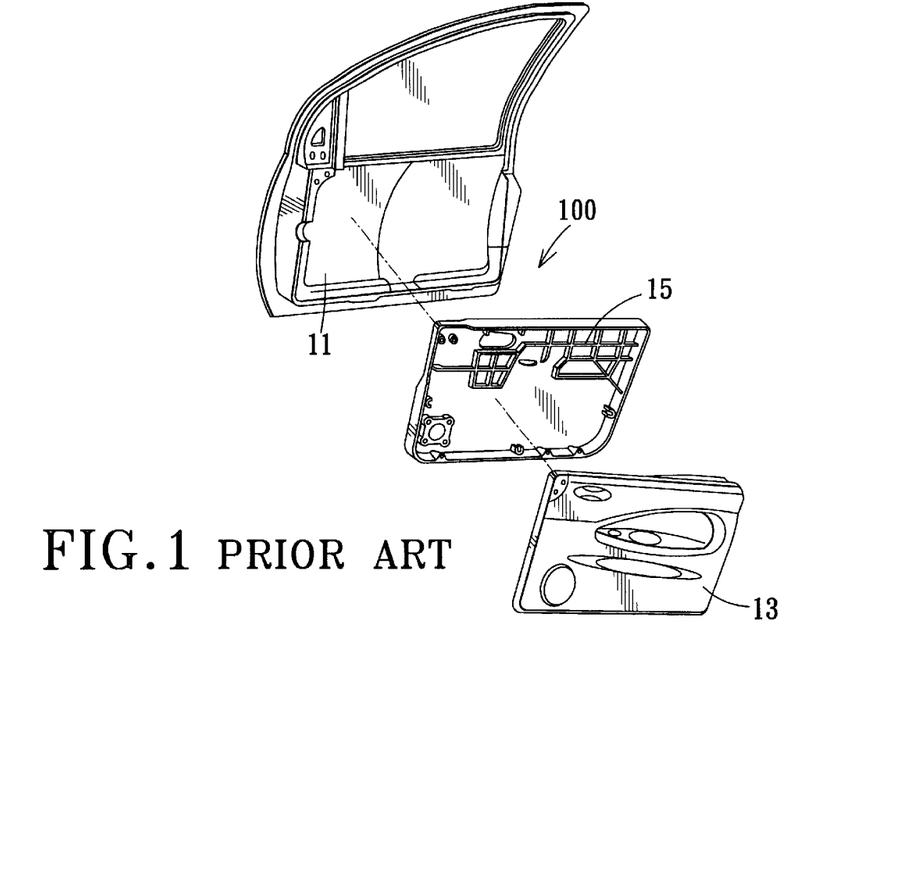
FIG. 1 is an exploded perspective view showing a conventional car door.
Figure 2:
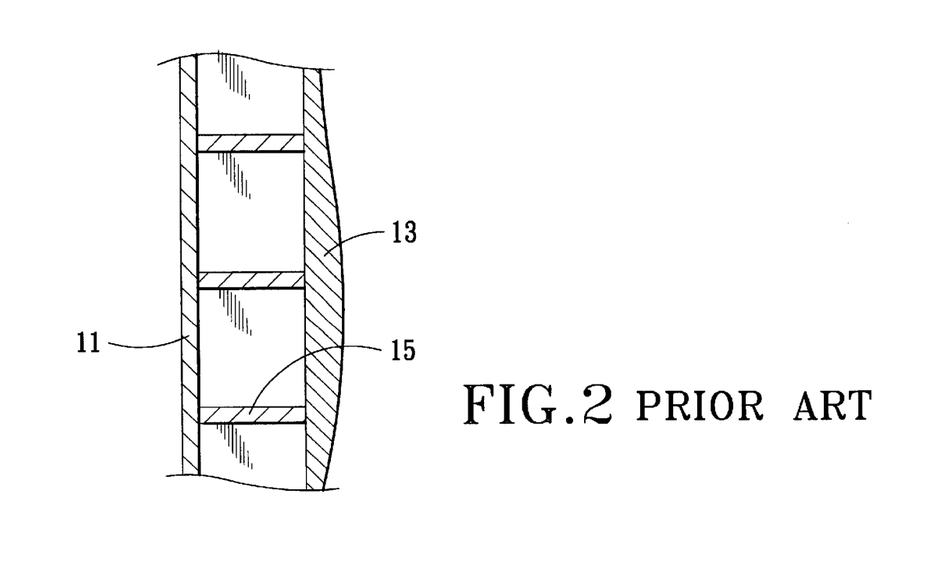
FIG. 2 is a fragmentary schematic sectional view showing the conventional car door of FIG. 1.

Referring to FIGS. 1 and 2, a conventional car door 100 is shown to include an outer wall 11, an inner wall 13, and a plurality of reinforcing ribs 15 disposed between the outer and inner walls 11, 13. However, the reinforcing ribs 15 cannot evenly distribute an external force such that the reinforcing ribs 15 may easily deform.

Figure 3:
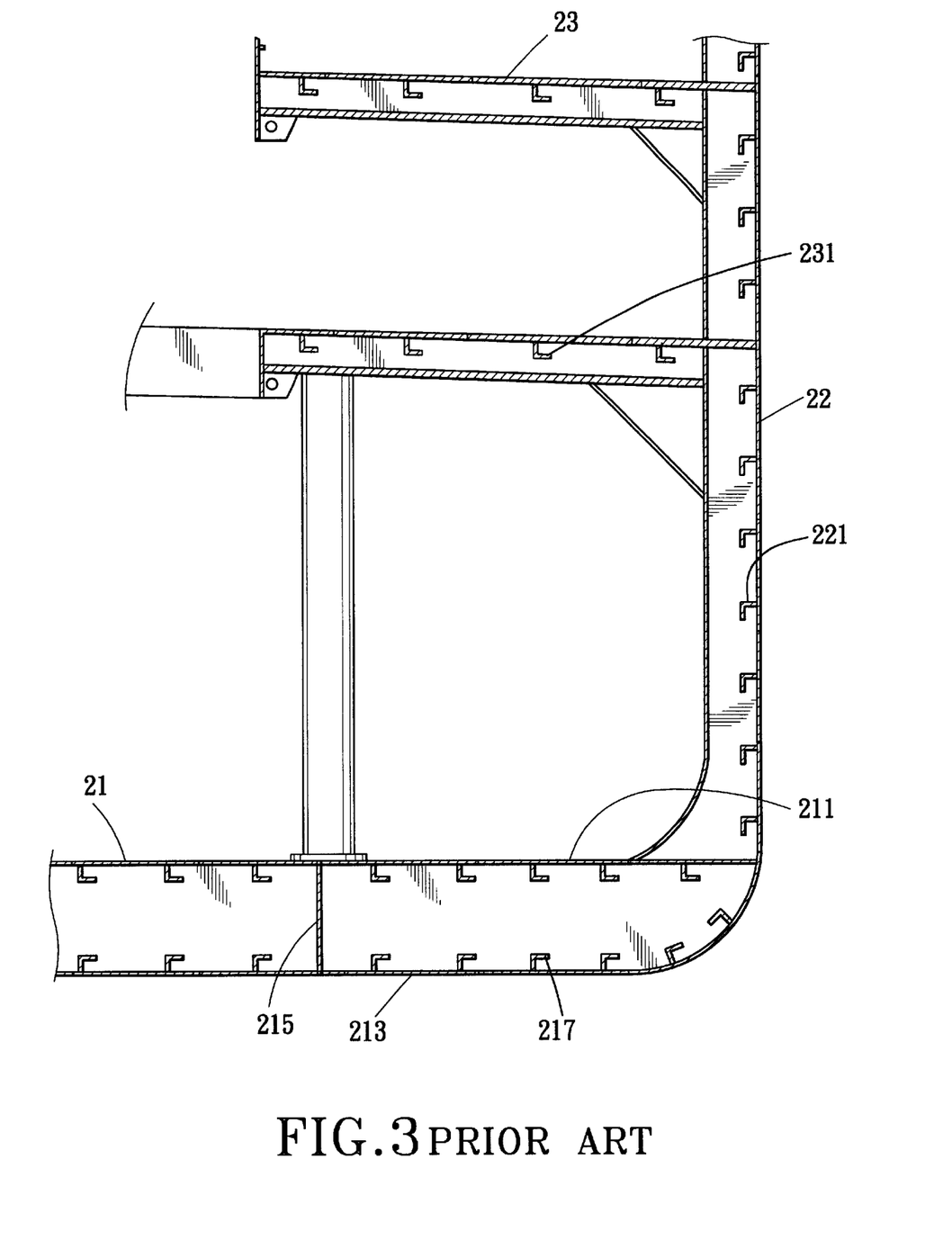
FIG. 3 is a fragmentary partly sectional view showing a conventional vessel body.

FIG. 3 illustrates a conventional vessel body that includes a bottom portion 21, a side portion 22 and a plurality of deck portions 23. The bottom portion 21 has inner and outer walls 211, 213, each of which is provided with a plurality of beams 217, and a plurality of supporting ribs 215 disposed between the inner and outer walls 211, 213. The side portion 22 is formed with a plurality of beams 221 disposed between inner and outer walls. Each deck portion 23 is also formed with a plurality of beams 231.

Figure 4:
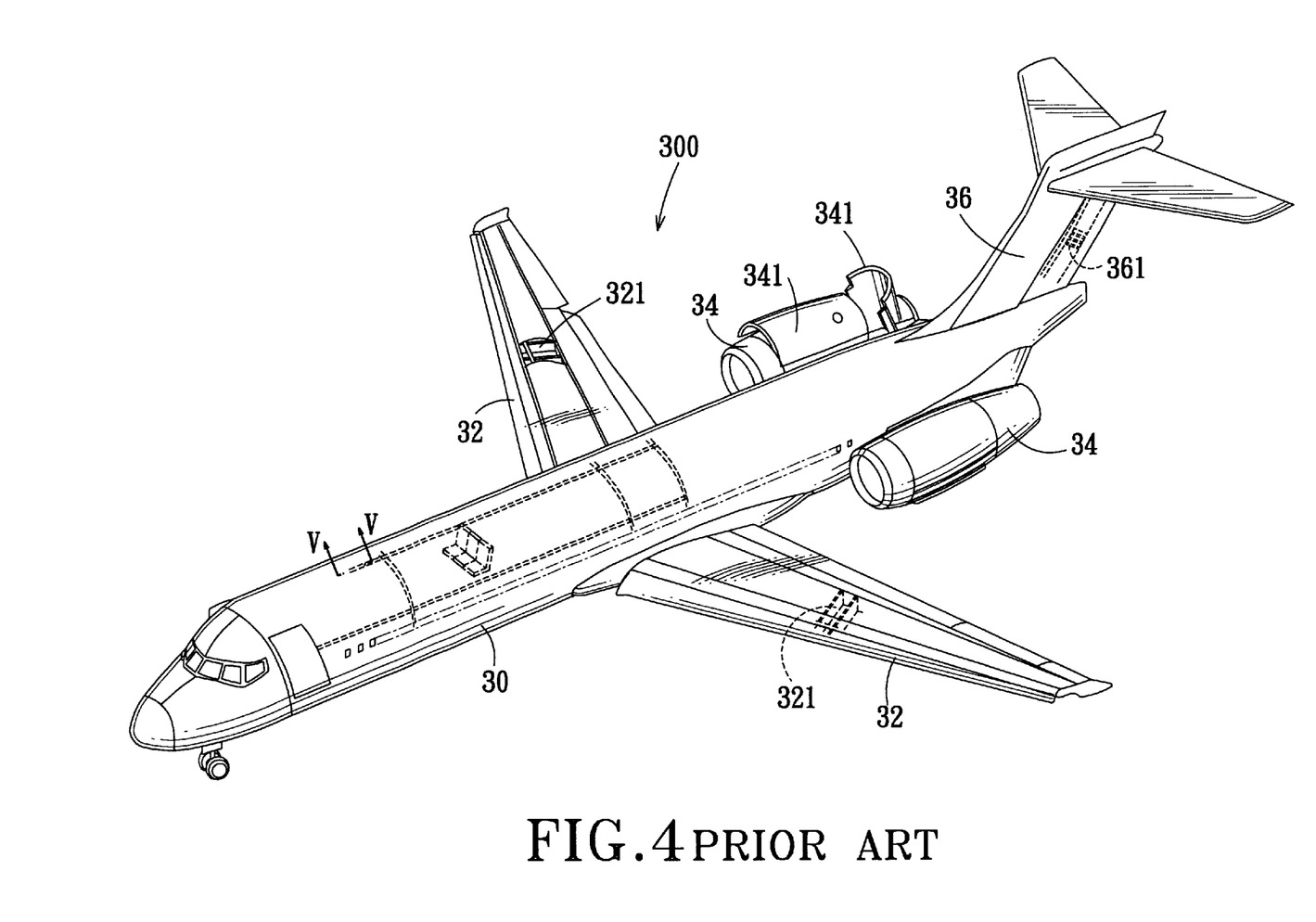
FIG. 4 is a perspective view showing a conventional aircraft.
Figures 5, 6:
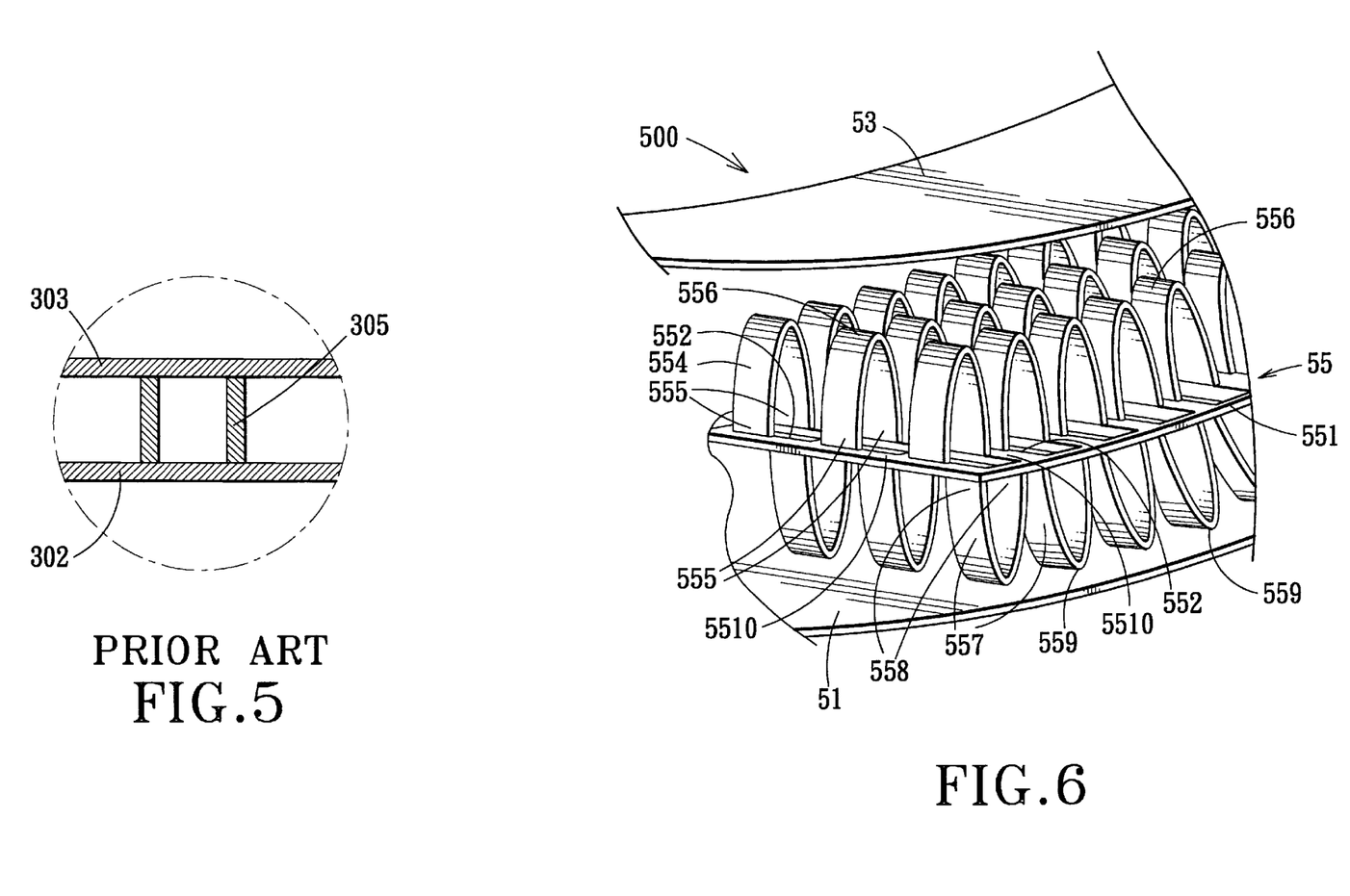
FIG. 5 is a schematic sectional view of a body of the conventional aircraft taken along line V—V in FIG. 4.
FIG. 6 is a fragmentary perspective view showing the first preferred embodiment of a vehicle body structure according to the present invention.

FIG. 4 illustrates a conventional aircraft 300 that includes a fuselage 30, two main wings 32, two engines 34 and a tail wing 36. Each of the fuselage 30, main wings 32 and tail wing 36 is formed with a supporting frame 305, 321, 361 disposed between inner and outer walls 302, 303, as best shown in FIG. 5. Each engine 34 is covered with a heavy cover 341.

SUMMARY OF THE INVENTION

Therefore, the object of the present invention is to provide a vehicle body structure that has improved resistance to external forces.

According to the present invention, a vehicle body structure comprises:

an outer wall;

an inner wall; and a reinforcing unit disposed between the outer and inner walls, the reinforcing unit including an intermediate plate disposed between the outer and inner walls, and a plurality of reinforcing members, each of which has a first U-shaped strip portion mounted fixedly between the inner wall and the intermediate plate, and a second U-shaped strip portion mounted fixedly between the outer wall and the intermediate plate, each of the first U-shaped strip portions having two ends connected fixedly to the intermediate plate, and a bent portion connected fixedly to the inner wall, each of the second U-shaped strip portions having two ends connected fixedly to the intermediate plate, and a bent portion connected fixedly to the outer wall.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Referring to FIG. 6, the first preferred embodiment of a vehicle body structure 500 according to the present invention is shown to include an outer wall 51, an inner wall 53, and a reinforcing unit 55 disposed between the outer and inner walls 51, 53.

The reinforcing unit 55 includes an intermediate plate 551 disposed between the outer and inner walls 51, 53, and a plurality of reinforcing members.

In this embodiment, the intermediate plate 551 has a plurality of elongated plate portions 5510, and a plurality of through holes 552 arranged in an array. Each of the through holes 552 has two opposite sides that are defined by one adjacent pair of the elongated plate portions 5510.

Each reinforcing member has a first U-shaped strip portion 554 mounted fixedly between the inner wall 53 and the intermediate plate 551, and a second U-shaped strip portion 557 mounted fixedly between the outer wall 51 and the intermediate plate 551. Each of the first U-shaped strip portions 554 has two ends 555 connected fixedly to the intermediate plate 551, and a bent portion 556 connected fixedly to the inner wall 53. Each of the second U-shaped strip portions 557 has two ends 558 connected fixedly to the intermediate plate 551, and a bent portion 559 connected fixedly to the outer wall 51. In this embodiment, each of the first and second U-shaped strip portions 554, 557 of each of the reinforcing members is disposed adjacent to a corresponding one of the through holes 552 and has the two ends 555, 558, which are connected respectively and fixedly to one adjacent pair of the elongated plate portions 5510 that define the two opposite sides of the corresponding one of the through holes 552. In this embodiment, the first and second U-shaped strip portions 554, 557 of the reinforcing members are in a staggered arrangement. The first U-shaped strip portions 554 are connected to the intermediate plate 551 and the inner wall 53 by welding. The second U-shaped strip portions 557 are connected to the intermediate plate 551 and the outer wall 51 by welding.

Figure 7:
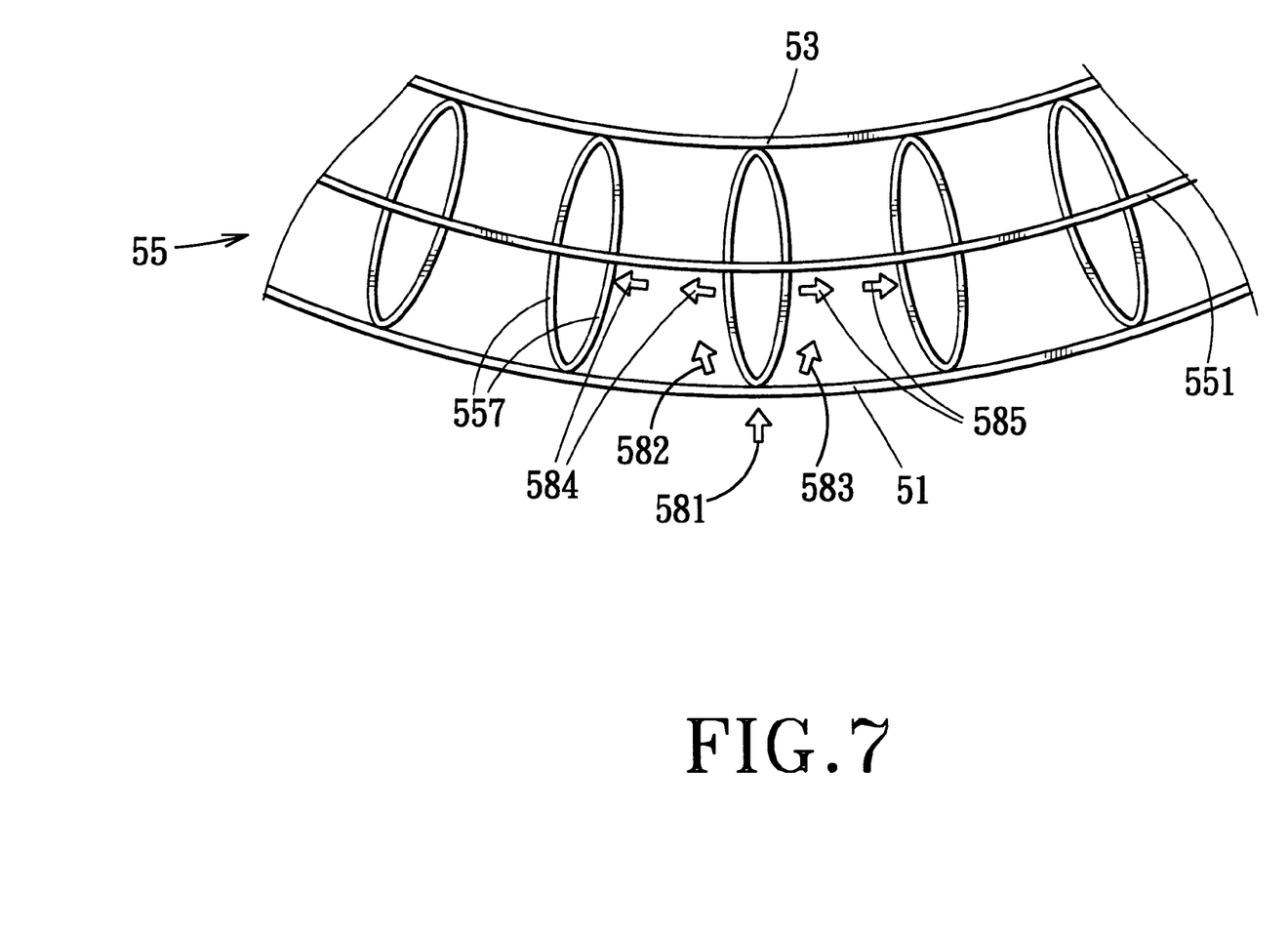
FIG. 7 is a schematic side view showing the first preferred embodiment.

With reference to FIG. 7, when an external force along a direction, as indicated by an arrow 581, acts on the outer wall 51 adjacent to one of the reinforcing members, the external force can be distributed via the second U-shaped strip portion 557 of said one of the reinforcing members, as indicated by arrows 582, 583, and the intermediate plate 53, as indicated by arrows 584, 585. As such, the vehicle body structure according to the present invention has improved resistance to external forces.

Figure 8:
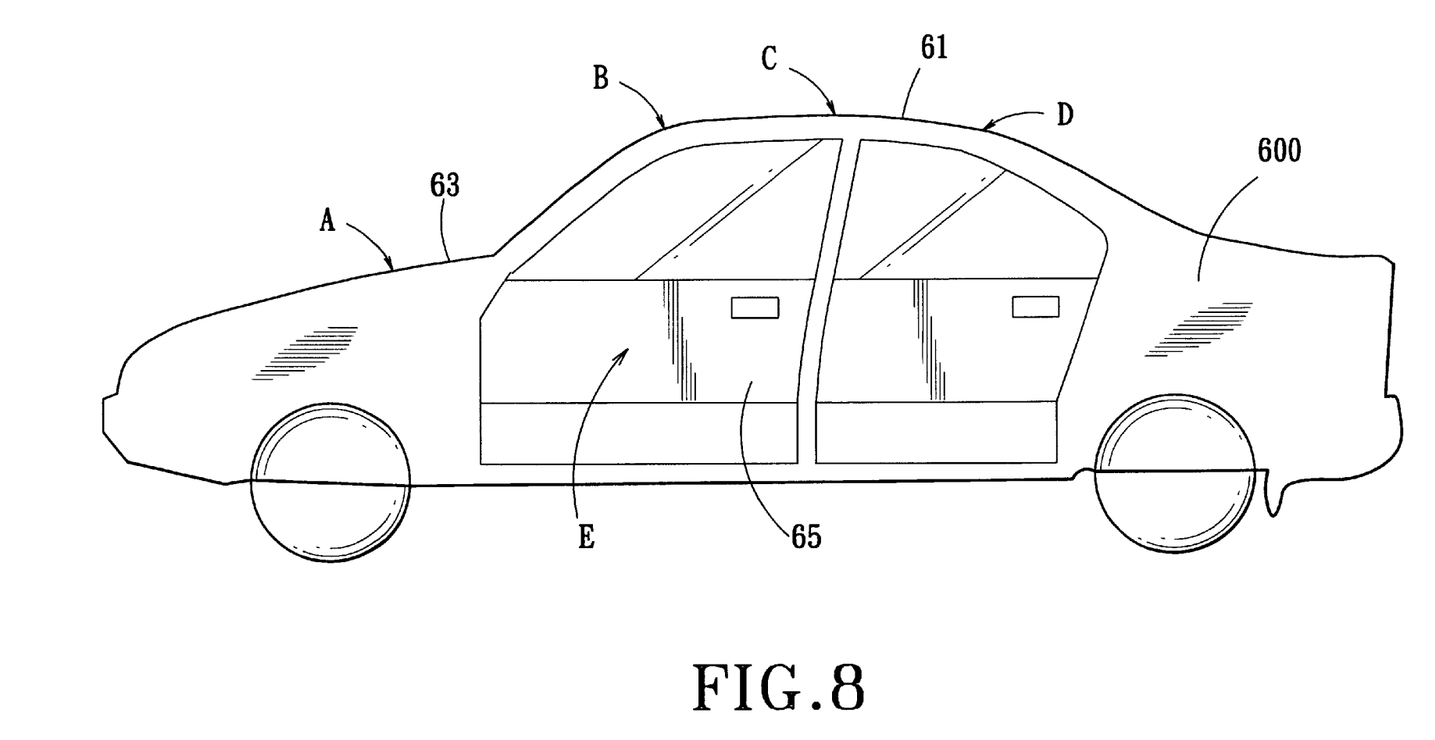
FIG. 8 is a schematic view showing a car incorporating the first preferred embodiment.
Figure 8A:
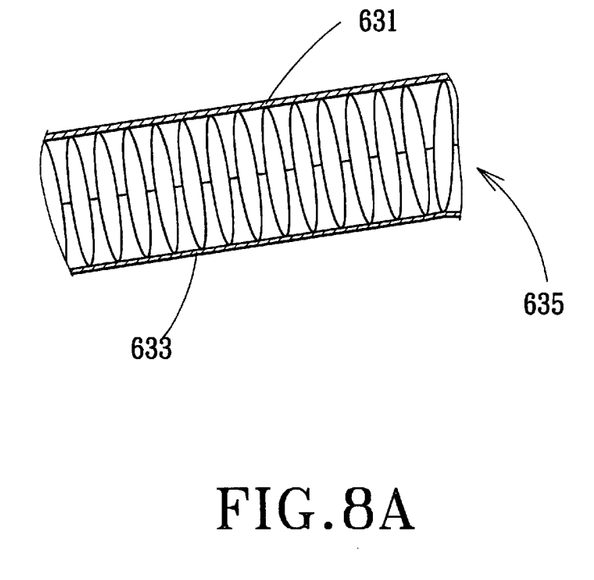
FIGS. 8A to 8E illustrate the first preferred embodiment when implemented at positions A, B, C, D and E, of the car, respectively.
Figure 8B:
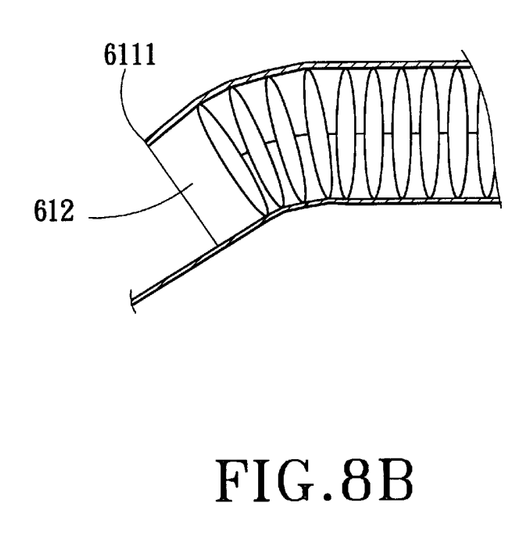
Figure 8C:
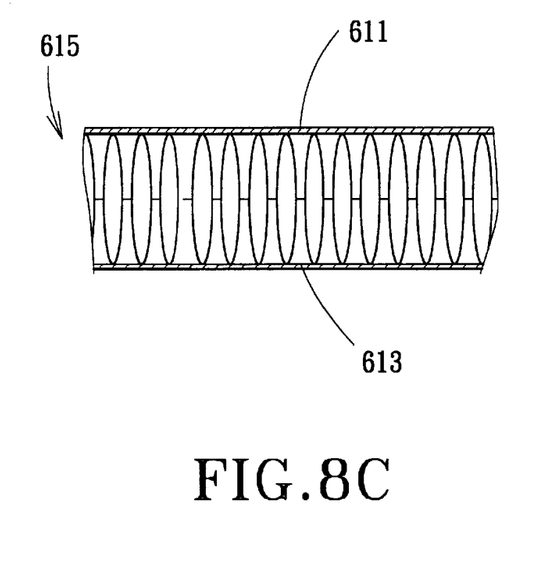
Figure 8D:
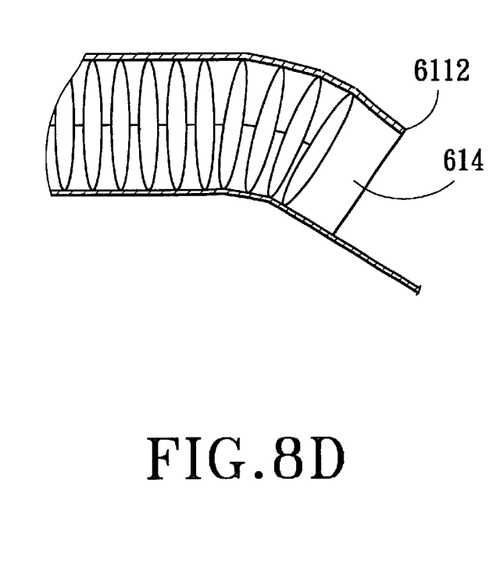
Figure 8E:
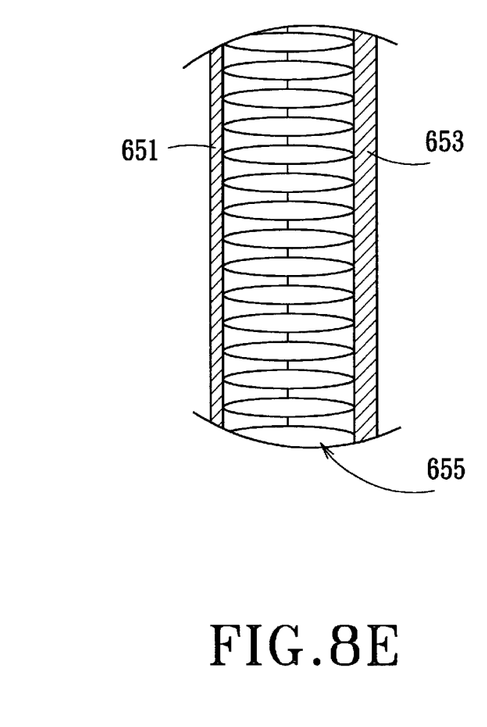

Referring to FIGS. 8 and 8A to 8E, the first preferred embodiment according to this invention is shown to be implemented in a car 600 that includes a roof portion 61, a hood portion 63, and a door portion 65. The roof portion 61 has the outer wall 611, the inner wall 613, and the reinforcing unit 615 disposed between the outer and inner walls 611, 613. It is noted that the roof portion 61 is formed with an air inlet 612 at a front end 6111 thereof, as shown in FIG. 8B, and an air outlet 614 at a rear end 6112 thereof, as shown in FIG. 8D. An air conduit, which is confined by the outer and inner walls 611, 613, communicates the air inlet 612 and the air outlet 614. As shown in FIG. 8A, the hood portion 63 has the outer wall 631, the inner wall 633, and the reinforcing unit 635. As shown in FIG. 8E, the door portion 65 has the outer wall 651, the inner wall 653, and the reinforcing unit 655.

Figure 9:
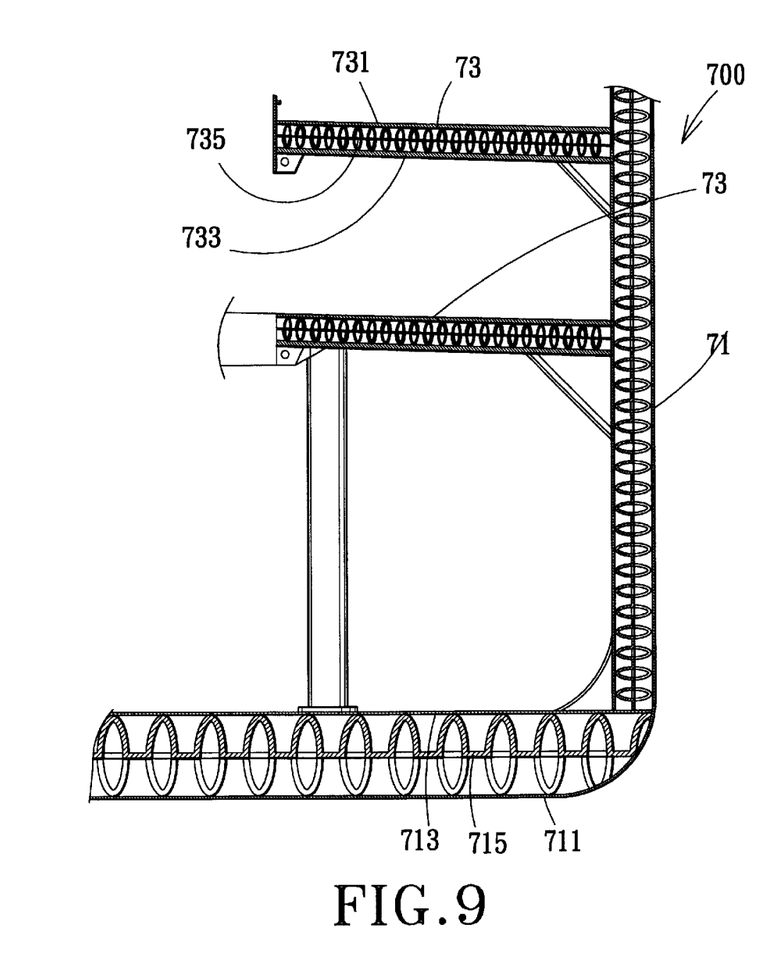
FIG. 9 is a fragmentary partly sectional view showing a vessel body incorporating the first preferred embodiment.

Referring to FIG. 9, the first preferred embodiment according to this invention is shown to be applied to a vessel body 700 that includes a main body portion 71 and a plurality of deck portions 73. The main body portion 71 has the outer wall 711, the inner wall 713, and the reinforcing unit 715 disposed between the outer and inner walls 711, 713. Each deck portion 73 has the outer wall 731, the inner wall 733, and the reinforcing unit 735 disposed between the outer and inner walls 731, 733.

Figure 10:
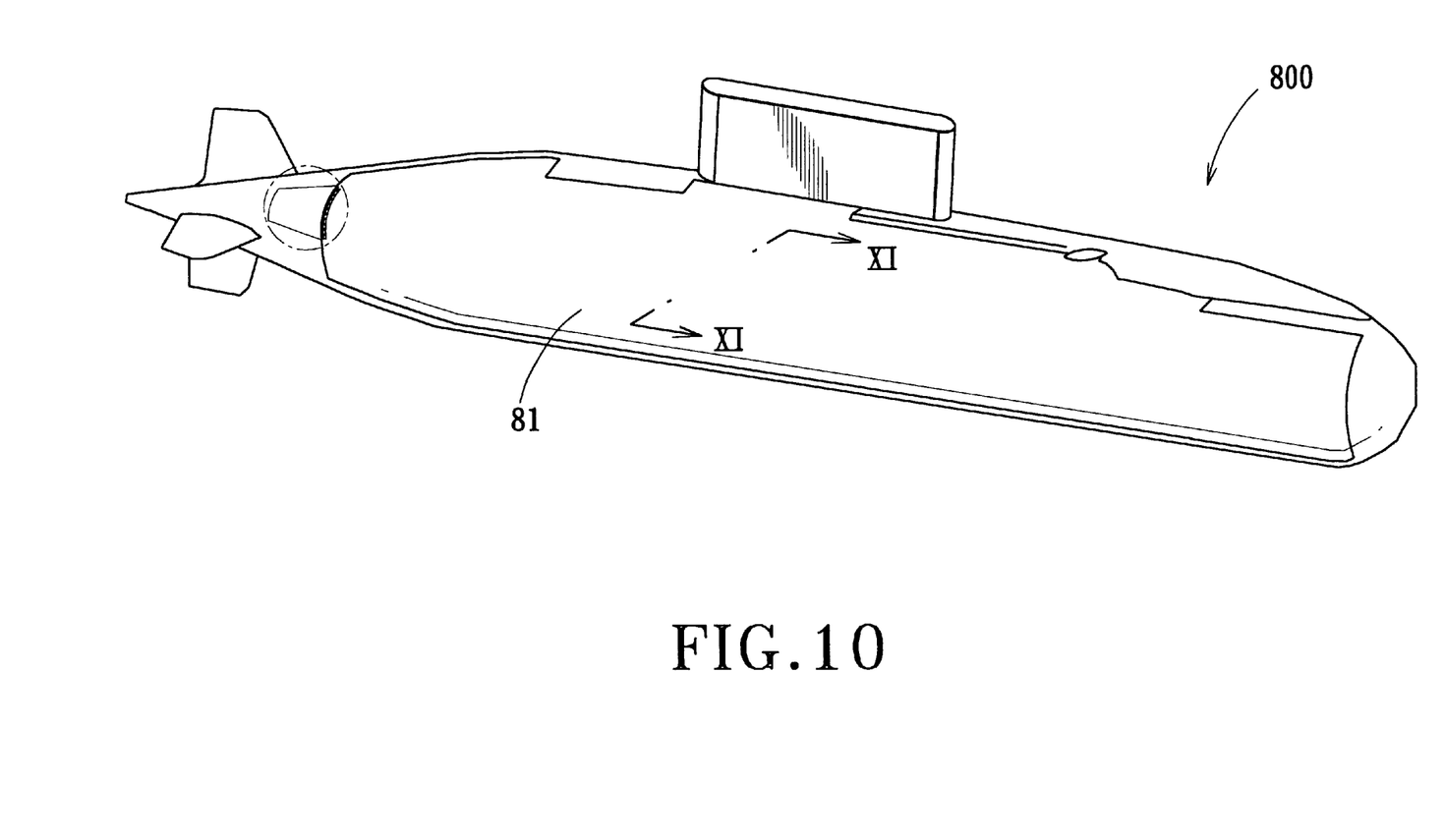
FIG. 10 is a perspective view showing a submarine incorporating the first preferred embodiment.
Figure 10A:
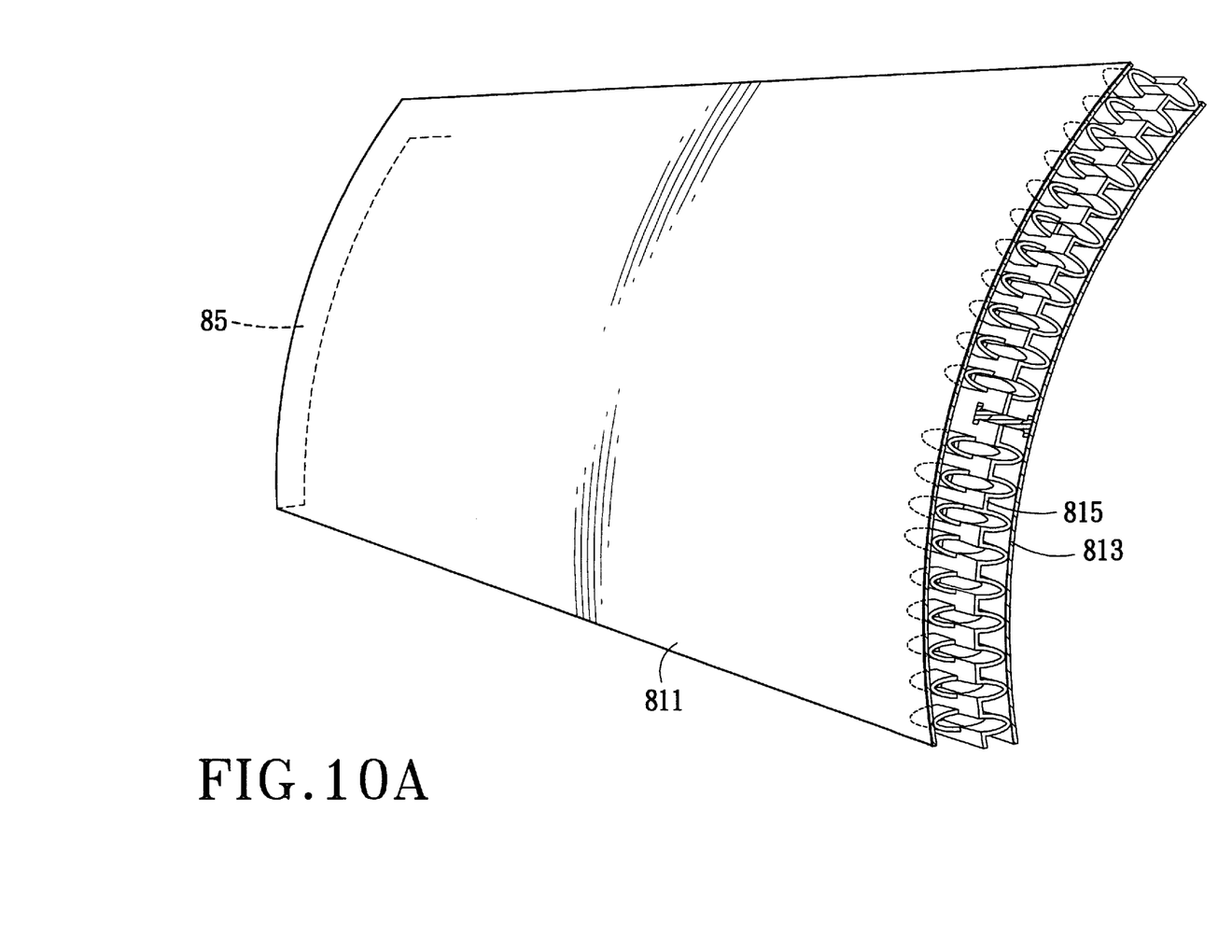
FIG. 10A is a perspective view showing an encircled portion of FIG. 10.
Figure 11:
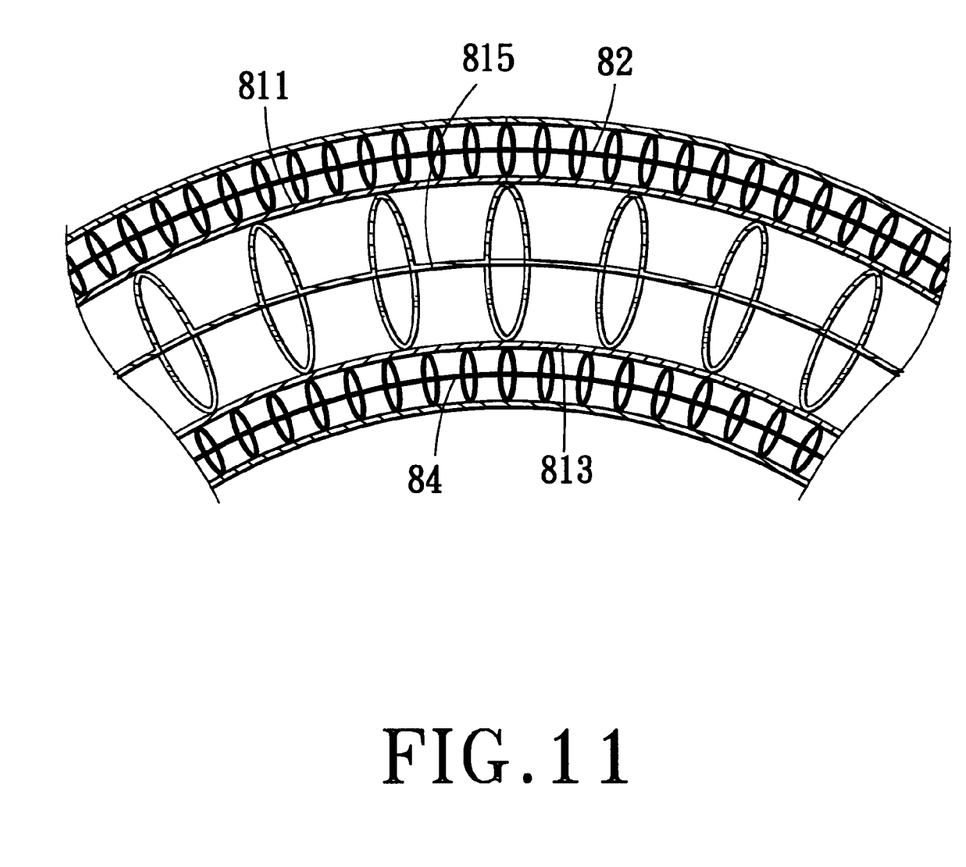
FIG. 11 is a schematic sectional view of the submarine body taken along line XI—XI in FIG. 10.

Referring to FIGS. 10, 10A and 11, the first preferred embodiment according to this invention is shown to be installed in a submarine 800 that has a main body 81. The main body 81 has the outer wall 811, the inner wall 813, and the reinforcing unit 815 disposed between the outer and inner walls 811, 813. The main body 81 further has two reinforcing layers 82, 84 attached on the outer and inner walls 811, 813, respectively, as shown in FIG. 11. Each of the reinforcing layer 82, 84 has the same structure as the first preferred embodiment. As such, further description with respect to the reinforcing layers 82, 84 are omitted for the sake of brevity. It is noted that each of the reinforcing layer 82, 84 can be filled with heat-insulating material (not shown) therein.

Figure 12:
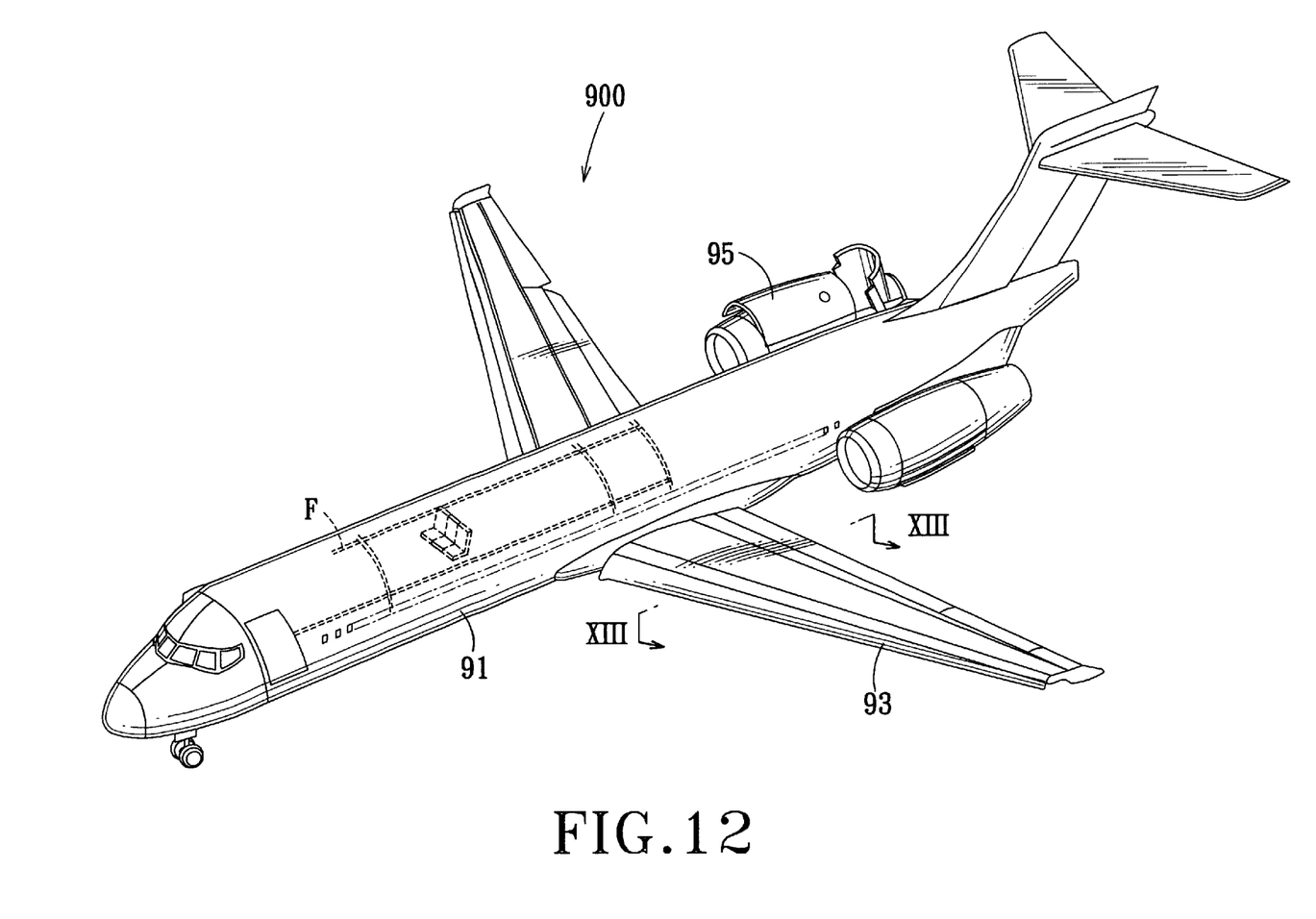
FIG. 12 is a perspective view showing an aircraft incorporating the first preferred embodiment.
Figure 12A:
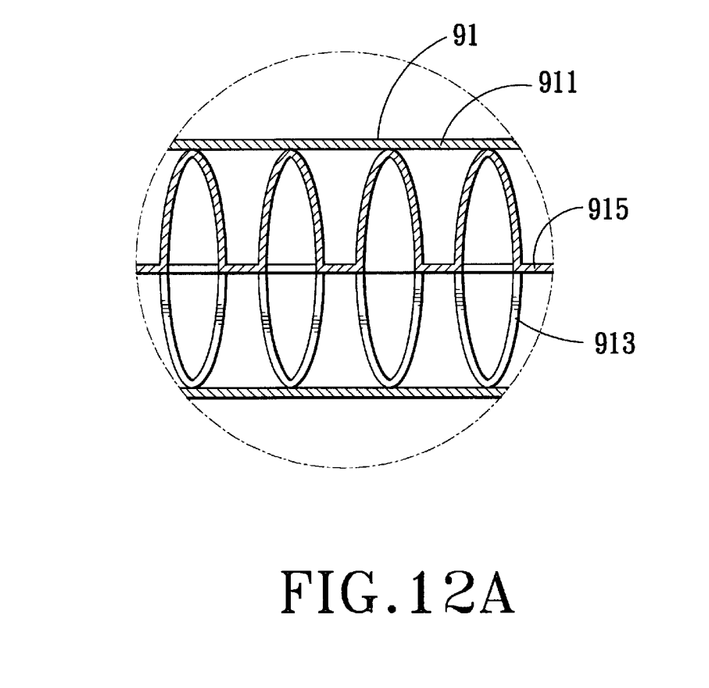
FIG. 12A illustrates the first preferred embodiment when applied to the aircraft of FIG. 12 at position F.
Figure 13:
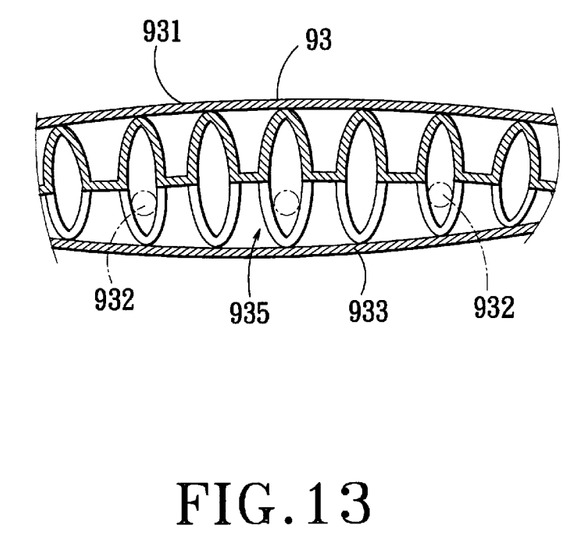
FIG. 13 is a fragmentary schematic sectional view showing a main wing of the aircraft taken along line XIII—XIII in FIG. 12.

Referring to FIGS. 12, 12A and 13, the first preferred embodiment according to this invention is shown to be used in an aircraft 900 that includes a main body portion 91, two main wings 93, and two covers 95 for covering two engines 34. The main body portion has the outer wall 911, the inner wall 913, and the reinforcing unit 915 disposed between the outer and inner walls 911, 913, as shown in FIG. 12A. Each main wing 93 has an upper wall 931, a lower wall 933, and the reinforcing unit 935. A plurality of oil pipes 932 can be disposed in the reinforcing unit 935, as shown in FIG. 13.

Figure 14:
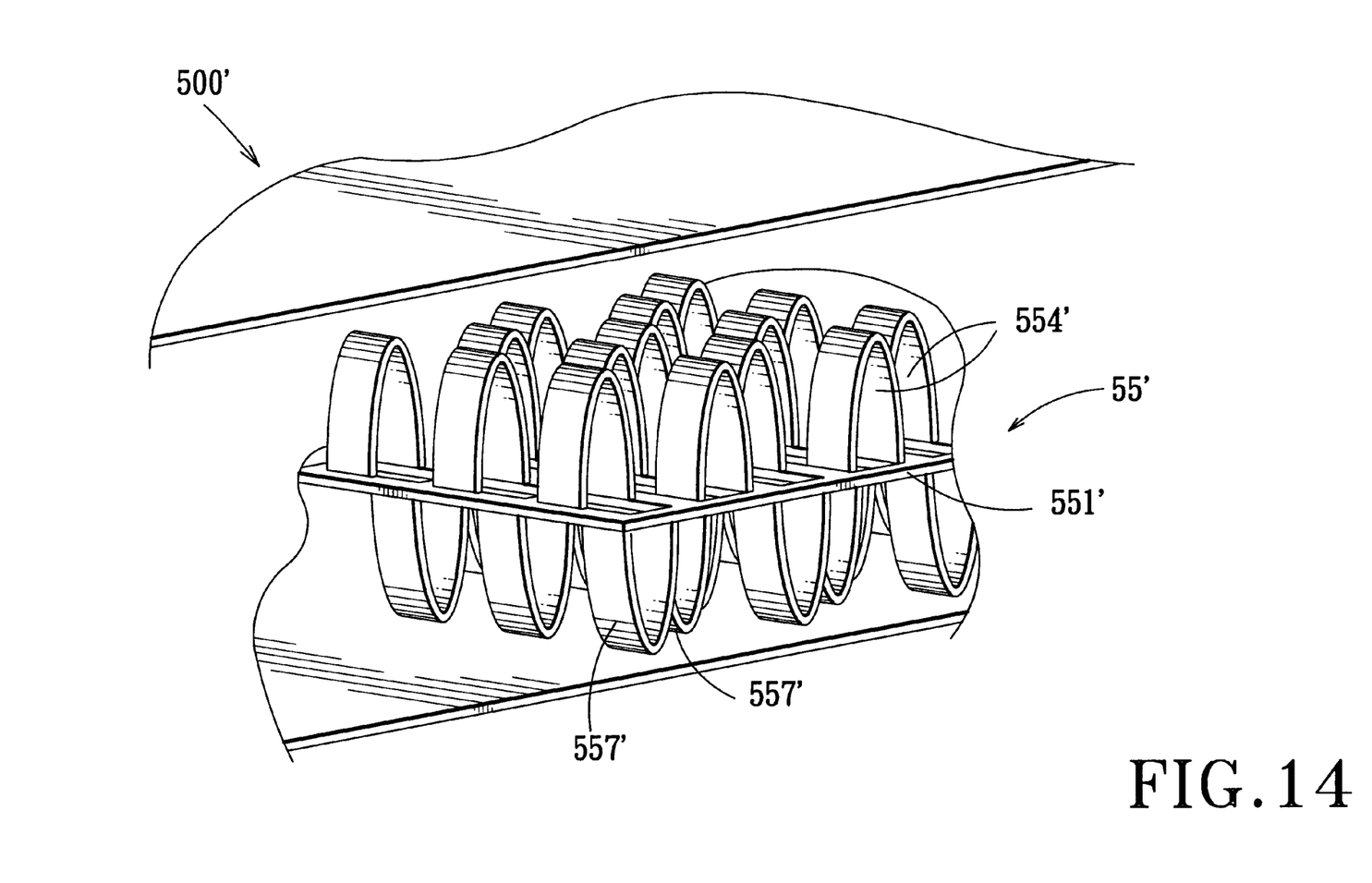
FIG. 14 is a fragmentary perspective view showing the second preferred embodiment of a vehicle body structure according to the present invention.

FIG. 14 illustrates the second preferred embodiment of a vehicle body structure 500' according to the present invention, which is a modification of the first preferred embodiment. Unlike the previous embodiment, the first U-shaped strip portions 554' of the reinforcing members of the reinforcing unit 55' are in a staggered arrangement. The second U-shaped strip portions 557' of the reinforcing members of the reinforcing unit 55' are also in a staggered arrangement.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A vehicle body structure comprising:

an outer wall;

an inner wall; and a reinforcing unit disposed between said outer and inner walls, said reinforcing unit including
an intermediate plate disposed between said outer and inner walls, and
a plurality of reinforcing members, each of which has a first U-shaped strip portion mounted fixedly between said inner wall and said intermediate plate, and a second U-shaped strip portion mounted fixedly between said outer wall and said intermediate plate, each of said first U-shaped strip portions having two ends connected fixedly to said intermediate plate, and a bent portion connected fixedly to said inner wall, each of said second U-shaped strip portions having two ends connected fixedly to said intermediate plate, and a bent portion connected fixedly to said outer wall.

2. The vehicle body structure as claimed in claim 1, wherein said intermediate plate has a plurality of elongated plate portions and a plurality of through holes, each of which has two opposite sides that are defined by one adjacent pair of said elongated plate portions, each of said first and second U-shaped strip portions of each of said reinforcing members being disposed adjacent to a corresponding one of said through holes and having said two ends, which are connected respectively and fixedly to one adjacent pair of said elongated plate portions that define said two opposite sides of the corresponding one of said through holes.

3. The vehicle body structure as claimed in claim 2, wherein said through holes are arranged in an array.

4. The vehicle body structure as claimed in claim 3, wherein said first U-shaped strip portions of said reinforcing members are in a staggered arrangement.

5. The vehicle body structure as claimed in claim 3, wherein said second U-shaped strip portions of said reinforcing members are in a staggered arrangement.

6. The vehicle body structure as claimed in claim 3, wherein said first and second U-shaped strip portions of said reinforcing members are in a staggered arrangement.

7. The vehicle body structure as claimed in claim 1, wherein said first U-shaped strip portions of said reinforcing members are connected to said intermediate plate and said inner wall by welding, and said second U-shaped strip portions of said reinforcing member are connected to said intermediate plate and said outer wall by welding.

* * * * *